April 13, 1954  L. TROY  2,675,099
FLUID PRESSURE, VEHICLE BRAKING SYSTEM
Filed Oct. 24, 1950  4 Sheets-Sheet 1

INVENTOR.
LEONARD TROY
BY
Ivan E. G. Konigsberg
Atty

April 13, 1954   L. TROY   2,675,099
FLUID PRESSURE, VEHICLE BRAKING SYSTEM
Filed Oct. 24, 1950   4 Sheets-Sheet 2

INVENTOR.
LEONARD TROY
BY

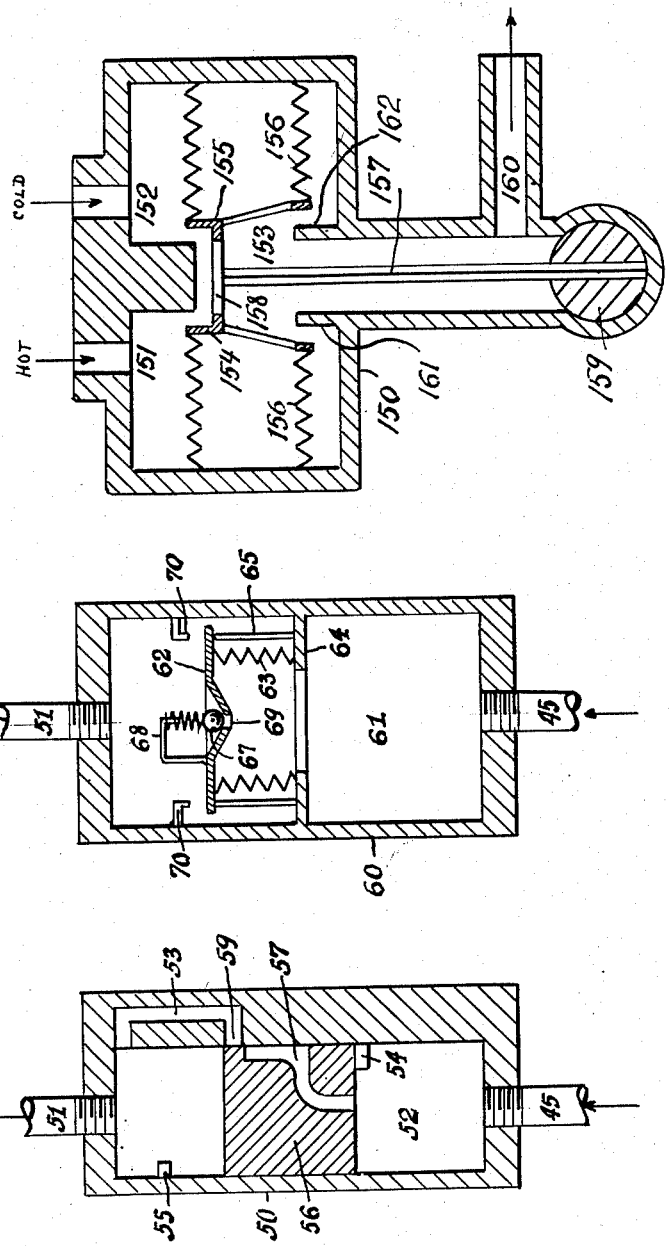

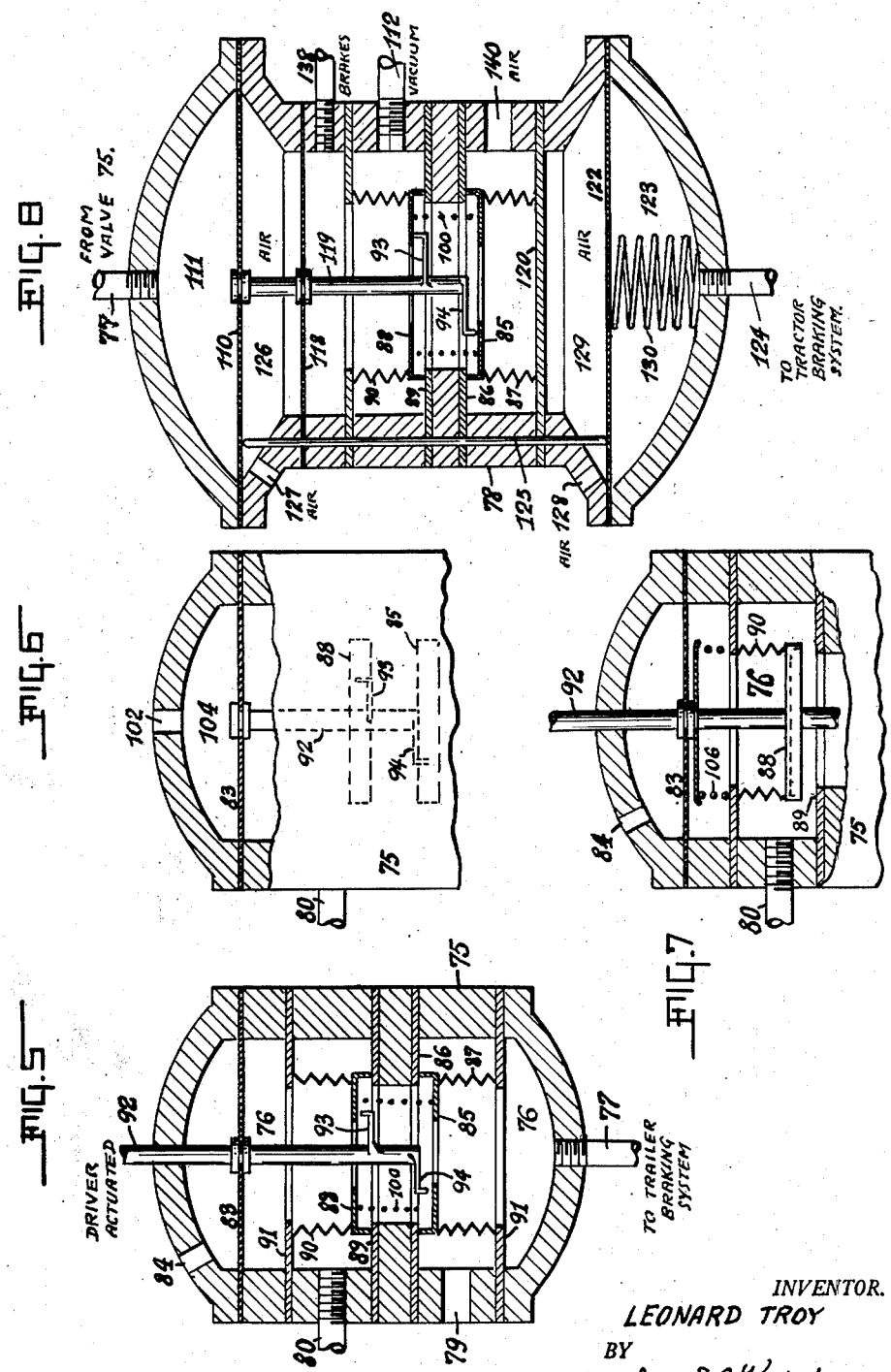

Patented Apr. 13, 1954

2,675,099

UNITED STATES PATENT OFFICE 2,675,099

FLUID PRESSURE VEHICLE BRAKING SYSTEM

Leonard Troy, Clarks Summit, Pa.

Application October 24, 1950, Serial No. 191,767

1 Claim. (Cl. 188—3)

This invention relates to improvements in brake systems and brake operating elements such as are employed in the operation of motor vehicles. The objects of the invention are to provide new and improved brake actuating and operating instrumentalities, units or valve mechanisms which may be combined in order to provide a safer, speedier and more efficient brake system in which a minimum of initial energy is utilized for maximum braking efficiency. Another object of the invention is to provide cylinder and valve units which may be incorporated in existing brake systems without requiring major changes in construction and arrangements of such systems and without requiring more skill in operation of the improved system than that which is now required from a skilled driver of an automobile truck, trailer or other motor vehicle.

The invention is disclosed in connection with the operation of a combined tractor and trailer, not because all the features of the invention are limited to such use, but because the novel features of the invention can best be understood and explained when described and illustrated in connection with such a complete embodiment. The invention may be used in the operation of a tractor alone or in the operation of an automobile truck. Some of the features may be used in automotive systems other than that described, claimed and illustrated in the following specification and accompanying drawings in which Fig. 1 is a diagram illustrating a complete braking system embodying the invention as applied in the operation of a combined tractor and trailer.

Figs. 3 and 4 are sectional views of two different forms of a self adjusting brake valve. One such valve is mounted in the braking system between the master cylinder and the brake cylinder of a wheel brake.

Figs. 5, 6, 7 and 8 are sectional views of different forms of pneumatic brake valves which are used in the braking system between the master cylinder and the brake cylinders of a trailer, for example.

Fig. 9 is a sectional view of a temperature control valve which may be used to control the temperatures in the automotive system according to this invention, or which may be used in non-automotive systems. It is included as an adaptation of the principle underlying the construction and operation of the pneumatic brake valves.

Figure 1:
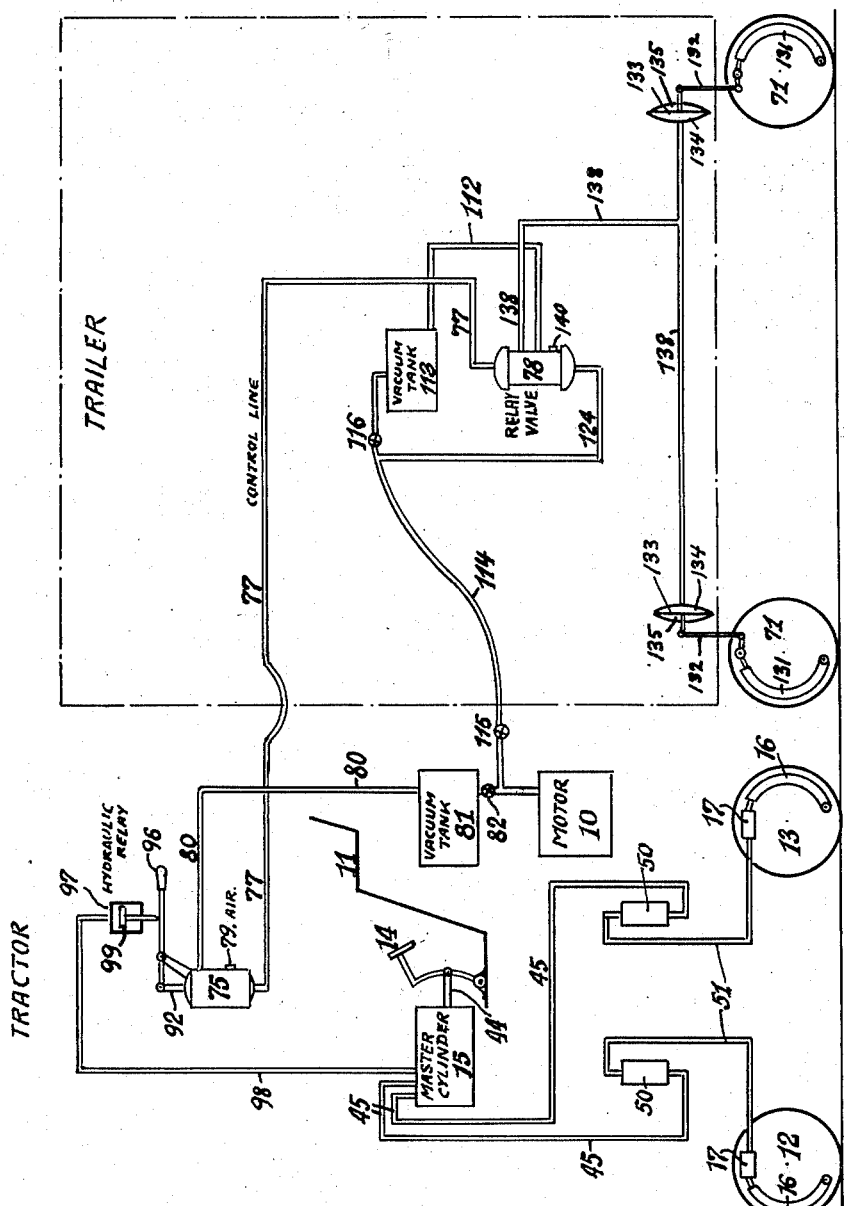

Referring first to Fig. 1, an automobile tractor or auto truck is diagrammatically identified for the purposes of this disclosure by the vehicle motor 10, the driver's seat 11, the front wheel 12 and the rear wheel 13. Only the wheels on one side of the tractor are shown, the system being the same for both sides. The foot brake pedal is shown at 14 and the master cylinder at 15. Each wheel has the usual brake 16 with brake cylinder 17, conventionally illustrated.

*The master cylinder.*—The valve mechanism is enclosed within a cylinder casing 15 provided with partitions 18 which divide the interior into a large pressure chamber 19 and a smaller pressure chamber 20 with an outlet chamber at 21. A fluid reservoir 22 is formed apart from the chambers with an inlet at 23 for filling in fluid indicated at 24. The reservoir communicates with the chambers 19 and 20 through ports 25 and 26, respectively. A single piston 27 is mounted to reciprocate within the two pressure chambers. The piston has a large head 28 and a smaller head 29 to fit the chambers. The larger piston head 28 has a feed back passage 30 which communicates with the reservoir through a port 31. A check valve 32 in the smaller piston head 29 controls the passage of fluid between the two chambers 19 and 20. Another check valve 33 controls the passage of fluid between the two chambers 19 and 22. The piston 27 is provided with a relief valve 34 which normally closes a port 35 under pressure of a spring 36 which acts upon the valve stem 37. The end of the stem is open to pressure in the chamber 20 as shown.

The outlet chamber 21 carries a double acting air valve 38 which operates automatically to prevent air from entering the master cylinder through a port 39 from leaks in the braking system. Such pre-set automatic air valves are known and used in the art, so a detailed description thereof is deemed not necessary. The outlet chamber 21 also contains a plurality of surge valves 40. There is one such valve for each wheel brake cylinder. Only two are shown. If there is a leak in the system between the master cylinder and the brake cylinders, a sudden surge of fluid to the leaking part will force the valve piston 41 upwards against a seat 42 thereby shutting off the supply of fluid to the leak while pressure will be maintained in the non-leaking brakes. When the leak has been repaired the piston 41 returns automatically to normal position.

The operation of the master cylinder is as follows: When it is desired to apply the brakes to the wheels, the driver steps on the brake pedal 14 which is connected by a linkage 44 to the master cylinder piston 27 and the latter moves forward, pressure thereby being built up in the chambers 19 and 20. The initial pressure is conveyed to the brake cylinders through the outlet chamber 21 and the pipe lines 45, Fig. 1, to apply good braking contact between the braking surfaces. At a predetermined brake pressure the relief valve 34 opens, the pressure in the chambers 19 and 20 having been equalized through the opening of the check valve 32. The ports 25 and 26 are now closed by the forward movement of the piston.

The pressure in the chamber 19 acts directly rearwardly upon the valve head 34. The pressure in the chamber 20 likewise acts upon the end of the valve stem 37. The fluid in chamber 19 now flows back into the reservoir through the open port 35, passage 30 and port 31. With the drop of pressure in the chamber 19, the relief valve 32 closes so that the pressure in the chamber 19 is completely cut off from the braking system. Since the piston pressure area in chamber 20 is much less than the total pressure areas of the two piston heads, a small increment of force applied to move the piston will produce a much larger increment of pressure than when both pressure chambers and both piston pressure areas are utilized. As the pressure in the smaller chamber 20 increases by further forward movement of the piston, more and more of the total force necessary to open the relief valve 34 will be exerted thereon until the pressure in the chamber 19 approaches zero and whereby the entire force applied on the brake pedal is utilized to apply the brakes.

When the pressure on the foot pedal is released, the piston 27 will return to its initial position by a spring 43. Relief valve 34 will close the port 35 by the spring 36. Ports 25, 26 and 31 will open to equalize the pressure and the check valve 33 will open so that pressure fluid may flow back into chamber 19.

The advantage of the master cylinder is that a large volume of fluid is initially utilized to start braking at the instant depression of the brake pedal and thereafter only a small increment in applied force is necessary to produce a very large braking pressure. The use of surge valves in the system insures that the flow of pressure fluid to leaking points will be instantly stopped while the other brake lines remain operable.

*Self adjusting brake valve.*—For each brake cylinder in the system a self adjusting brake valve 50 is employed to permit unlimited flow of pressure fluid from the master cylinder to the brake cylinder 17 and permit only a predetermined quantity of fluid to pass back to the master cylinder thereby compensating for wear on braking surfaces and keeping them in close proximity or full adjustment. The self adjusting brake valve receives operating fluid from the master cylinder through the aforesaid pipe lines 45 and is in turn connected to the brake cylinder by a pipe line 51, Fig. 1.

Fig. 3 is a sectional view of one embodiment of a self adjusting brake valve according to this invention. The valve housing 50 contains a valve chamber 52. The valve housing has a bypass 53 and two piston stops 54 and 55. A piston 56 with a passage 57 is mounted to slide in the chamber 52. When the master cylinder is operated as described above, pressure fluid enters the valve chamber 52 through the pipe line 45. The piston 56 then rises in the valve chamber and the pressure upon the fluid in front of the piston will normally be sufficient for braking purposes. If however, the brakes do not respond to such pressure because of poor adjustment or for other reasons, the piston 56 will continue to rise and move past the port 59. More fluid will then flow from the master cylinder to the brake cylinder 17 by way of passages 57 and 53, the added pressure compensating for whatever irregularity may exist in the performance of the braking surfaces. When the pressure is released, the piston 56 will return and be seated on the stop 54 thereby sealing the fluid in the restricted space in front of the piston and maintaining the braking surfaces in close proximity ready to respond to the next braking operation. The upper stop 55 limits the forward movement of the piston 56.

Another embodiment of the self adjusting brake valve is illustrated in Fig. 4. The valve housing 60 forms a chamber 61 containing braking fluid and is provided with a plate valve 62 to which bellows 63 is attached, the lower edge of the bellows being secured to a flange 64 which supports upstanding stops 65 upon which the plate valve rests. The valve has a check valve 67 with a spring attached to a support 68 on the plate valve. The latter has a port 69 controlled by the check valve. Projections 70, 70 are upper stops for the plate valve.

In operation, when fluid from the master cylinder 15 enters the valve chamber 61 through the pipe line 45, the pressure will cause the plate valve to rise until it strikes the stops 70. If now the brakes are in proper adjustment, the increase in pressure above the plate valve will suffice for braking pressure which is increased by the expansion of the bellows 63. If however, the brakes do not respond properly to the pressure thus far applied, continued pressure from the master cylinder will cause the check valve 67 to open and additional fluid will then pass through the port 69 to the brake cylinder via connection 51. When the pressure stops increasing, the check valve 67 will close and when the pressure is released the bellows 63 will collapse and the plate valve then returns to the stops 65, there being then sufficient clearance between the braking surfaces to compensate for wear and maintain the brakes in good adjustment.

The braking system and units explained in the foregoing provide means for applying the tractor brakes. The entire disclosure includes, however, means for also applying the trailer brakes and to accomplish this object certain other elements are incorporated in the system. Such other elements are herein called pneumatic brake valves and are illustrated in Figs. 5–8.

For a better understanding of the operation and function of the pneumatic brake valve units it may be noted that there are two basic types of vacuum brake systems known in the art. One type is known as the brakes in air suspended system characterized by the air in the control lines being evacuated in order to apply the brakes. The other type is known as air suspended vacuum operated brakes characterized by vacuum being normally maintained in the control lines, but is reduced or eliminated upon application of the brakes. If the trailer brake system is that of air suspended vacuum operated brakes, the brakes are applied by exhausting the air in the brake control lines whereby to apply the brakes. One embodiment of a pneumatic brake valve for this purpose is illustrated in Fig. 5. See also Fig. 1 in which the trailer is indicated as having wheels 71, 71, only one side being shown. In explaining the function of the pneumatic brake valves according to this invention, the brakes themselves are not shown, nor their construction explained because it is known in the art how such brakes are manufactured and operated when vacuum is utilized to apply the brakes.

*The pneumatic brake valves.*—The valve, Fig. 5, consists of a valve casing 75 having a valve chamber 76 which is connected by a pipe line 77 to a pneumatic relay valve 78, Fig. 1, or to the trailer brakes direct. The valve chamber 76 has an air inlet at 79 and a vacuum suction outlet at 80 connected to a vacuum tank 81 operated in known manner from the motor 10, Fig. 1. A check valve 82 controls the passage from the motor to the tank.

Figure 2:
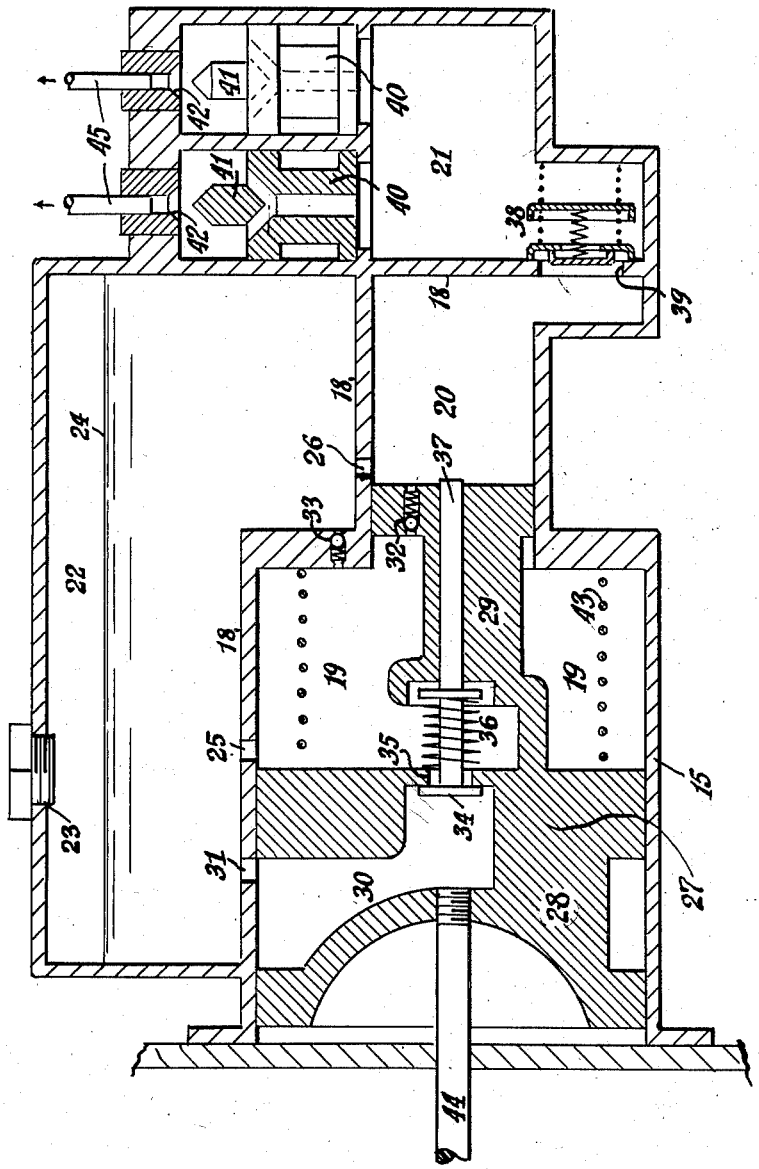
Fig. 2 is a sectional view of a master cylinder which is part of the braking system and which is operated by the driver of the tractor, with or without a trailer, in the same manner and for the same purpose as a conventional master cylinder is operated and used in motor vehicle braking systems now used.

In the valve 75 a diaphragm 83 is stretched across the chamber 76 and above the diaphragm there is an air port 84. The chamber contains two plate valves. The lower valve 85 closes against a valve seat 86 and is connected by bellows 87 to a supporting flange 91. The valve 85 controls the passage of air from the inlet 79 to the chamber 76. A second plate valve 88 closes against a seat 89 and is provided with bellows 90 connected to another flange 91 as shown. The valve 88 controls the passage of air from the chamber 76 out through the suction outlet 80. The diaphragm 83 carries a valve stem 92 having arms 93, 94 for opening the valves 88, 85, respectively. The valve stem, see Fig. 1, may be manually operated by a hand lever 96, or it may be operated from the master cylinder through a hydraulic relay 97 which is connected to the master cylinder outlet chamber 21 by a connection 98 similar to the connection 45 shown in Fig. 2. The relay 97 has a pressure actuated piston 99 adapted to engage the hand lever 96 for operation (lifting) of the valve stem 92 in the valve 75, Fig. 5.

The operation is as follows: When the driver operates the hand lever 96 or when he steps on the foot pedal 14 to apply the trailer brakes, the valve stem 92 is lifted in the valve chamber 76 and the arm 93 opens the plate valve 88 so that air in the chamber 76, above and below the valve 88, and in the trailer brake system, via connection 77, is exhausted through the vacuum outlet 80 until the forces of suction below the diaphragm 83 balance the lifting force applied to the valve stem 92. As this lifting brake applying force is reduced by gradual release of the foot pedal so that it is less than the suction below the diaphragm, the latter will be drawn inward and the upper plate valve 88 will close. At the same time the arm 94 on the stem 92 will move the lower valve 85 down from its seat 86 and thereby open communication between chamber 76 and the air port 79. Atmospheric air will then flow into the chamber. The diaphragm 83 will be moved back into initial position and the valve mechanism will again be balanced, the two plate valves being closed by expansion of the bellows which also serve to prevent leakage from the chamber 76 to the connections 79 and 80. A spring 100 may be used to assist in closing the valves.

From this it will be seen, that when the brakes are to be applied, the air in the brake control lines is evacuated by suction (vacuum). When the pressure on the brake pedal is reduced, vacuum is cut off from the brake lines and air enters the same to balance the system for the next operation. The operation and function of the pneumatic brake valve as shown in Fig. 5 therefore meets the definition of an air suspended vacuum operated brake system explained above.

The valve shown in Fig. 5 may also be used for applying brakes in what is known as the air system. In such a system the actuating force applied to the valve stem 92 is reversed. The valve stem is being depressed instead of being lifted. This may be done, for example, by rearranging the hand lever 96 and the hydraulic relay 97 to depress the stem 92 instead of lifting it. Such re-arrangement is not shown it being obvious from the illustration in Fig. 1.

The operation of the valve in Fig. 5 when it is used in air systems is easily understood from the foregoing description of the valve. With the change in direction of movement of the valve stem 92 the valve is operated as follows:

Air pressure is supplied through the inlet 79 and the connection 80 is open to the atmosphere. When the brakes are to be applied, the valve stem 92 is moved down (not up) in the chamber 76 to open the valve 85 so that air under pressure may be admitted to chamber 76 through the inlet 79 and through connection 77 to the trailer brake system to apply the brakes. When the air pressure in chamber 76 from inlet 80 against the diaphragm 83 is sufficient to balance the downward force exerted upon the valve stem 92, the diaphragm lifts the stem so that the valve 85 will again close and the system will again be in equilibrium. If the downward pressure on the stem 92 is reduced, the air pressure below the diaphragm will tend to move the valve stem upwards thereby opening the other valve 88 and permit some air to escape into the atmosphere via connection 80 until the system is again balanced.

Fig. 6 illustrates a modification in which pneumatic, or hydraulic pressure, or vacuum may be applied through an inlet 102 to the chamber 104 above the diaphragm 83 for operating the valve instead of using a force applied directly to the valve stem by the hand lever or hydraulic relay 97 as explained above.

Another modification of a pneumatic brake valve is shown in Fig. 7 for use in an air suspended vacuum operated brake system which is used on tractor trailer combinations in which vacuum is maintained in the brake control lines at all times except when the vacuum is either reduced or completely released. In this modification a spring 106 is provided to push the valve stem 92 upwards so as to keep the upper plate valve 88 open. Compare Fig. 5. The valve chamber 76 and the trailer brake system will then be normally under a vacuum from the connection 80. The force of the spring 106 is such that it balances the suction force below the diaphragm 83 and vacuum is maintained in the brake control lines.

When the brakes are to be applied, the valve stem 92 is depressed by the same—reversed—mechanism explained above, Fig. 1, so that the upper valve 88 is closed against the force of the spring, thereby opening the lower valve 85 to admit air through the inlet 79 to reduce or eliminate the vacuum in valve chamber 76 and in the control lines via the connection 77. The outside force to depress the valve stem 92 is again balanced by the reduced suction below the diaphragm 83 and the force of the spring 106 so that valve 88 is again opened and the chamber 76 becomes open to suction from the connection at 80.

If the downward actuating force on the valve stem is reduced or withdrawn, the spring 106 will again open the upper valve 88 and thereby again open the chamber 76 and the brake lines to vacuum applied through the line 80.

The operating principle of the pneumatic brake valve described may be applied to a brake valve in a system of the air suspended vacuum operated brake type where the valve then may be used as a high speed relay valve with provision for automatic release of the brakes, for example, when the valve is used as a relay valve on a trailer tractor combination. Such a type of valve is shown in Fig. 8 to which reference is now made.

*Pneumatic relay valve.*—The mechanism is contained within a valve casing 78, Figs. 1 and 8, having an upper diaphragm 110 forming a suction chamber 111 to which vacuum is applied from the pneumatic brake valve 75, Figs. 1 and 5, through a suction pipe 77 which enters the valve 78 at the top as shown. Below the diaphragm 110 there is a second smaller diaphragm 118. Both diaphragms carry the valve stem 119 having arms 93 and 94 for operating plate valves 88 and 85 which have bellows 86, 87, the arrangement being the same as shown in Fig. 5. The lower bellows 87 are secured to a partition 120. Below the latter is a third diaphragm 122 forming a chamber 123 which is connected to the tractor vacuum line 114 by a pipe line 124, see Fig. 1. One or more push rods 125 are slidably carried in the valve casing 78. The push rod rests upon the lowermost diaphragm 122 and at the top the rod engages the diaphragm 118.

The space between the two upper diaphragms forms an air chamber 126 with an air port 127. The space between the diaphragm 118 and the partition 120 forms a brake chamber which is connected to the trailer brakes by connection 138. Vacuum is supplied to this chamber through vacuum pipe 112 whereby the valve 78 is connected with a trailer vacuum tank 113 which in turn is connected to the tractor vacuum tank 81 by a pipe line 114, see Fig. 1. Below the lower plate valve 85 there is an air inlet at 140. The space above the lowermost diaphragm 122 forms another air chamber 129 with an air port 128. A spring 130 acts against the diaphragm 122.

Each trailer wheel, Fig. 1, has a brake member 131 operated by a suitable linkage 132 connected to a diaphragm 133 within a casing forming two separate chambers 135 and 134. The chamber 134 is connected with the valve 78 by the aforesaid pipe line 138.

The operation of the relay valve 78 is as follows: The trailer brakes 131 are normally suspended in air by the diaphragms 133 in chambers 135 and 134. If now the connection 114 should break, the vacuum in the lowermost valve chamber 123—which vacuum is supplied to the chamber via the pipe connection 124 from the tractor vacuum tank 81—will be lost. The spring 130 will then exert its force upwards against the diaphragm 122 and by means of the push rod 125 cause the upper diaphragm to be lifted. This movement is in turn transferred to the valve stem 119 and the arm 93 will open the upper plate valve 88. Vacuum will immediately pass from vacuum connection 112, open valve 88, to the brake control lines 138 to chamber 134 and the brakes will instantly and automatically be applied by the air pressure in the chambers 135. The trailer brakes being thus applied constitute a safety measure automatically operable when the connection to the tractor brake system fails.

When the trailer brakes are to be applied by the driver, he steps on the brake pedal 14 and through the relay 97 and the pneumatic brake valve 75 suction is applied to the upper chamber 111 in the relay valve 78. The diaphragm 110 is drawn upwards and the upper plate valve 88 is opened as explained above. Vacuum is then applied to the brakes through the pipe lines 112 and 138 and the brakes are applied. When the pressure is removed from the foot pedal 14, air enters the chamber 111 from the pneumatic brake valve 75 and vacuum supplied through pipe line 112 causes the diaphragm 118 to be moved inwardly so that the lower valve 85 is opened. Air then enters the brake chamber and the system is again balanced because air pressure below the diaphragm 118 will cause the lifting of the valve stem 119 whereby the lower plate valve 85 will again be closed.

Since the diaphragm 110 can be made much larger than the diaphragm 118, a smaller pressure change in the system acting upon the diaphragm 110 will cause a much larger and speedier change in brake pressure and a much faster application of the brakes results from this construction.

A temperature control valve is illustrated in Fig. 9. It is included in the disclosure because it is an adaptation of the principles underlying the operation of the pneumatic brake valve except that the actuating element responds to changes in temperature instead of responding to changes in pressures. The valve comprises a valve casing 150 having an inlet 151 for the hot component and an inlet 152 for the cold component, the inlets leading to a mixing chamber 153 provided with two valves 154 and 155 which are connected to the casing by bellows 156. The valves are adapted to be opened and closed by a thermostat 157 having an operating head 158. The thermostat is carried by an adjusting shaft 159. The valve has an outlet at 160.

As shown in the drawing, the two components will mix in equal proportions in the mixing chamber 153. If the mixture gets warmer than the setting of the thermostat is adjusted for, the dissimilar metals in the thermostat will cause it to move so as to close, partly or entirely, the valve 154 against the valve seat 161 and thereby diminishing or shutting off the warm supply and also further open the cold valve 155 away from its valve seat 162 and thereby increase the cold supply. If the mixture gets too cold, the operation is reversed. The valves are operated by the head 158 of the thermostat engaging the frame members of the valves as shown. The setting of the thermostat is adjusted by rotating the shaft 154 by any suitable means.

No attempt has been made in this disclosure of the invention to illustrate or describe any particular details of construction of the several valves or units. They will of course be manufactured in accordance with established production practice. The entire braking system disclosed is characterized by non-complicated structures functioning to provide a novel, efficient, speedy and safe braking system. The invention is not limited to the exact embodiments disclosed. It is to be understood that changes may be made within the principles of the invention and the scope of the appended claim.

I claim:

In a braking system of the character described, an air suspended vacuum operated brake; a pneumatic relay valve for exhausting the atmospheric air from said brake to apply the same comprising a valve casing provided with five chambers; a flexible diaphragm placed between the first and a second chamber; said first chamber being the uppermost chamber; a second flexible diaphragm placed between said second and the third chamber below said second chamber; a fixed partition in said valve below said third chamber; a trailer vacuum tank; pipes connecting said third chamber with said trailer vacuum tank and with said brake; an air inlet to said third chamber; valve elements in said third chamber controlling the passage of vacuum and air to the said brake to apply and release the same; a valve stem in said valve connecting the said two diaphragms with said valve element to operate the latter; a pneumatic brake valve; a pipe connecting the latter with the said first chamber in the pneumatic relay valve for supplying vacuum thereto to flex the said first diaphragm to actuate the said valve stem and valve elements; a tractor vacuum tank; a third flexible diaphragm placed below said fixed partition and providing said pneumatic relay valve with two chambers below the partition; a pipe connecting the chamber below the last mentioned diaphragm with both of said vacuum tanks; a valve rod resting upon the last named diaphragm and extending upwards to engage underneath said first named diaphragm to lift the latter and the said valve stem to actuate said valve elements to apply the brake when a breakage occurs in the last named connecting pipe and a spring acting against said valve rod supporting diaphragm to flex the same upwards when the break occurs as aforesaid.

References Cited in the file of this patent

UNITED STATES PATENTS

| Number | Name | Date |
|---|---|---|
| 1,569,143 | Robinson | Jan. 12, 1926 |
| 2,150,021 | Christensen | Mar. 7, 1939 |
| 2,161,279 | Bowen | June 6, 1939 |
| 2,215,172 | Christensen | Sept. 17, 1940 |
| 2,228,631 | Kuiper | Jan. 14, 1941 |
| 2,230,048 | Elliott | Jan. 28, 1941 |
| 2,266,264 | Reed | Dec. 16, 1941 |
| 2,279,276 | Oliver | Apr. 7, 1942 |
| 2,304,621 | Baade et al. | Dec. 8, 1942 |
| 2,349,051 | Novak | May 16, 1944 |
| 2,374,855 | Fitch | May 1, 1945 |
| 2,385,625 | Hopmans | Sept. 25, 1945 |
| 2,442,057 | Page | May 25, 1948 |
| 2,498,108 | Gunderson | Feb. 21, 1950 |
| 2,537,535 | Larsson | Jan. 9, 1951 |
| 2,544,849 | Martin | Mar. 13, 1951 |

FOREIGN PATENTS

| Number | Country | Date |
|---|---|---|
| 564,097 | Great Britain | Sept. 13, 1944 |